(12) United States Patent
Kimata

(10) Patent No.: US 9,575,865 B2
(45) Date of Patent: Feb. 21, 2017

(54) INFORMATION PROCESSING SYSTEM AND MONITORING METHOD

(71) Applicant: NEC Corporation, Minato-ku, Tokyo (JP)

(72) Inventor: Isao Kimata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 123 days.

(21) Appl. No.: 14/576,638

(22) Filed: Dec. 19, 2014

(65) Prior Publication Data

US 2015/0178140 A1    Jun. 25, 2015

(30) Foreign Application Priority Data

Dec. 24, 2013  (JP) .................................. 2013-265577

(51) Int. Cl.
*G06F 11/00* (2006.01)
*G06F 11/34* (2006.01)
*G06F 11/30* (2006.01)

(52) U.S. Cl.
CPC ....... *G06F 11/3452* (2013.01); *G06F 11/3062* (2013.01); *G06F 11/3006* (2013.01); *G06F 11/3024* (2013.01)

(58) Field of Classification Search
CPC .................................................. G06F 11/3451

USPC ................................ 714/47.1, 47.2, 47.3, 48
See application file for complete search history.

(56) References Cited

U.S. PATENT DOCUMENTS

| 2008/0008443 | A1* | 1/2008 | Chiu | ........................ | H04N 5/91 |
| | | | | | 386/241 |
| 2011/0313726 | A1* | 12/2011 | Parthasarathy | ...... | G05B 23/024 |
| | | | | | 702/179 |
| 2014/0244192 | A1* | 8/2014 | Craig | ................. | G05B 23/0229 |
| | | | | | 702/62 |

FOREIGN PATENT DOCUMENTS

JP          2001-86572 A       3/2001

\* cited by examiner

*Primary Examiner* — Dieu-Minh Le

(57) ABSTRACT

An abnormal state of an allocated task in a processing node is detected correctly without using any resource of the processing node. A power usage statistics storing unit 240 stores a statistical value representing a power usage of the processing node in a state of executing the task. A power usage comparing unit 250 compares a newly collected power usage of the processing node in a state of executing the task with the statistical value representing a power usage of the processing node, which is stored in the power usage statistics storing unit 250, to detect an abnormal state of the task in the processing node.

10 Claims, 12 Drawing Sheets

Fig. 5

TASK START TELEGRAM

| DESTINATION | Nx (x=1, ..., n) |
|---|---|
| TRANSMISSION SOURCE | M |
| COMMAND | "START TASK" |

Fig. 6

TASK TERMINATION TELEGRAM

| DESTINATION | M |
|---|---|
| TRANSMISSION SOURCE | Nx (x=1, ..., n) |
| COMMAND | "TERMINATE TASK" |
| RESULT | {"NORMAL TERMINATION" \| "ABNORMAL TERMINATION"} |

Fig. 7

TELEGRAM PATTERN (TASK START TELEGRAM)

| COMMAND = "TASK START" |
|---|

Fig. 8

TELEGRAM PATTERN (TASK TERMINATION TELEGRAM)

| COMMAND = "TERMINATE TASK" |
|---|

Fig. 9

PROCESSING NODE : N1

| SAMPLING INTERVAL | POWER USAGE (Wh) (AVERAGE VALUE) |
|---|---|
| 1 | 50 |
| 2 | 100 |
| 3 | 120 |
| 4 | 50 |

Fig. 10

PROCESSING NODE: N1

| SAMPLING INTERVAL | POWER USAGE (Wh) (COLLECTED VALUE) | POWER USAGE (Wh) (AVERAGE VALUE) | DIFFERENCE | |
|---|---|---|---|---|
| 1 | 45 | 50 | -10% | |
| 2 | 80 | 100 | -20% | |
| 3 | 30 | 120 | -75% | ABNORMAL |
| 4 | | 50 | | |

Fig. 11

TASK START TELEGRAM

| DESTINATION | Nx (x=1, ..., n) |
|---|---|
| TRANSMISSION SOURCE | M |
| TASK IDENTIFIER | Ty (y=0,1, ···) |
| COMMAND | "START TASK" |

Fig. 12

TASK TERMINATION TELEGRAM

| DESTINATION | M |
|---|---|
| TRANSMISSION SOURCE | Nx (x=1, ..., n) |
| COMMAND | "TERMINATE TASK" |
| TASK IDENTIFIER | Ty (y=0,1, ···) |
| RESULT | {"NORMAL TERMINATION" \| "ABNORMAL TERMINATION"} |

Fig. 13

PROCESSING NODE: N1

| SAMPLING INTERVAL | POWER USAGE (Wh) (AVERAGE VALUE) |
|---|---|
| 1 | 50 |
| 2 | 100 |
| 3 | 120 |
| 4 | 50 |
| 5 | 50 |

Fig. 14

PROCESSING NODE: N1

| SAMPLING INTERVAL | POWER USAGE (Wh) (COLLECTED VALUE) | NUMBER OF ADDITIONAL LOADS | DETERMINATION RANGE | POWER USAGE (Wh) (AVERAGE VALUE) | DIFFERENCE | |
|---|---|---|---|---|---|---|
| 1 | 55 | 0 | -20%, +20% | 50 | +10% | |
| 2 | 140 | 1 | -20%, +40% | 100 | +40% | |
| 3 | 190 | 2 | -20%, +60% | 120 | +59% | |
| 4 | 45 | 0 | -20%, +20% | 50 | -10% | |
| 5 | 15 | 0 | -20%, +20% | 50 | -70% | ABNORMAL |

Fig. 16

| TASK | USED NODE |
|------|-----------|
| T1   | S1, S2    |
| T2   | S2        |

Fig. 17

PROCESSING NODE: N1, TASK: T1

| SAMPLING INTERVAL | POWER USAGE (Wh) (AVERAGE VALUE) |
|-------------------|----------------------------------|
| 1                 | 100                              |
| 2                 | 80                               |
| 3                 | 80                               |
| 4                 | 100                              |
| 5                 | 50                               |

TASK: T1, USED NODE: S1

| SAMPLING INTERVAL | POWER USAGE (Wh) (AVERAGE VALUE) |
|-------------------|----------------------------------|
| 1                 | 10                               |
| 2                 | 90                               |
| 3                 | 90                               |
| 4                 | 50                               |
| 5                 | 10                               |

TASK: T1, USED NODE: S2

| SAMPLING INTERVAL | POWER USAGE (Wh) (AVERAGE VALUE) |
|-------------------|----------------------------------|
| 1                 | 10                               |
| 2                 | 50                               |
| 3                 | 50                               |
| 4                 | 90                               |
| 5                 | 10                               |

Fig. 18

PROCESSING NODE: N1, TASK: T1

| SAMPLING INTERVAL | POWER USAGE (Wh) (COLLECTED VALUE) | POWER USAGE (Wh) (AVERAGE VALUE) | DIFFERENCE |
|---|---|---|---|
| 1 | 105 | 100 | +5% |
| 2 | 80 | 80 | 0% |
| 3 | 90 | 80 | +12.5% |
| 4 | 80 | 100 | -20% |
| 5 |  | 50 |  |

TASK: T1, USED NODE: S1

| SAMPLING INTERVAL | POWER USAGE (Wh) (COLLECTED VALUE) | POWER USAGE (Wh) (AVERAGE VALUE) | DIFFERENCE | |
|---|---|---|---|---|
| 1 | 9 | 10 | -10% | |
| 2 | 90 | 90 | 0% | |
| 3 | 80 | 90 | -11% | |
| 4 | 15 | 50 | -70% | ABNORMAL |
| 5 |  | 10 |  | |

TASK: T1, USED NODE: S2

| SAMPLING INTERVAL | POWER USAGE (Wh) (COLLECTED VALUE) | POWER USAGE (Wh) (AVERAGE VALUE) | DIFFERENCE |
|---|---|---|---|
| 1 | 10 | 10 | 0% |
| 2 | 50 | 50 | 0% |
| 3 | 50 | 50 | 0% |
| 4 | 90 | 90 | 0% |
| 5 |  | 10 |  |

INFORMATION PROCESSING SYSTEM AND MONITORING METHOD

This application is based upon and claims the benefit of priority from Japanese Patent Application No. 2013-265577, filed on Dec. 24, 2013, the disclosure of which is incorporated herein in its entirety by reference.

TECHNICAL FIELD

The present invention relates to an information processing system and a monitoring method.

BACKGROUND ART

In a typical distributed processing system which allows a plurality of processing nodes to execute tasks distributed thereto via a network, when an abnormal state of one of the processing nodes has been detected, a management node reallocates tasks having been allocated thereto to a normal processing node, and this method enables improvement of the availability of the entire system.

Well-known methods for detecting such an abnormal state of a processing node include a polling method, in which a management node inquires of each of processing nodes for normality thereof and detects an abnormal state thereof when a reply therefrom is not normal; a heartbeat method, in which each of processing nodes notifies a management node of its own state at predetermined constant intervals; and the like. In these methods, an abnormal state of a processing node is likely to be erroneously detected although allocated tasks are being normally executed in the processing node because of delays of replies or notifications, or the like, due to a delay of a network and/or execution of task processing which needs a large number of resources of the processing node.

In order to reduce the occurrences of such an erroneous detection, a method of causing each of processing nodes to sufficiently reserve resources allocated to processing for replying to polling or resources allocated to processing for notifying of heartbeats is conceived. In this case, however, the number of resources which can be allocated to task processing is decreased by a number equal to the number of resources allocated to such reply processing or notification processing.

In addition, as a related technology, in Japanese Patent Application Laid-Open Publication No. 2001-086572, there is disclosed a technology which confirms an operational state of each of a plurality of devices by collecting a power consumption amount of the each of the devices. In the case where this technology is applied to the above detection of an abnormal state of a processing node, an energized state of the processing node can be detected, but it is difficult to detect whether or not allocated tasks are being normally executed in the processing node.

SUMMARY

An exemplary object of the present invention is that the aforementioned problem is solved and an information processing system and a monitoring method, which make it possible to correctly detect an abnormal state of an allocated task in each of processing nodes without using any resource of the each of processing nodes, are provided.

An information processing system according to an exemplary aspect of the invention includes a power usage statistics storing unit that stores a statistical value representing a power usage of a processing node in a state of executing a task; and a power usage comparing unit that compares a newly collected power usage of the processing node in a state of executing the task with the statistical value representing a power usage of the processing node, which is stored in the power usage statistics storing unit, to detect an abnormal state of the task in the processing node.

An information processing method according to an exemplary aspect of the invention includes storing a statistical value representing a power usage of a processing node in a state of executing a task; and detecting an abnormal state of the task in the processing node by comparing a newly collected power usage of the processing node in a state of executing the task with the statistical value representing a power usage of the processing node.

A non-transitory computer readable storage medium recording thereon a program, according to an exemplary aspect of the invention causes a computer to perform a method including: storing a statistical value representing a power usage of a processing node in a state of executing a task; and detecting an abnormal state of the task in the processing node by comparing a newly collected power usage of the processing node in a state of executing the task with the statistical value representing a power usage of the processing node.

BRIEF DESCRIPTION OF THE DRAWINGS

Exemplary features and advantages of the present invention will become apparent from the following detailed description when taken with the accompanying drawings in which:

FIG. 5 is a diagram illustrating an example of a task start telegram according to the first exemplary embodiment of the present invention.

FIG. 6 is a diagram illustrating an example of a task termination telegram according to the first exemplary embodiment of the present invention.

FIG. 7 is a diagram illustrating an example of a telegram pattern of the task start telegram according to the first exemplary embodiment of the present invention.

FIG. 8 is a diagram illustrating an example of a telegram pattern of the task termination telegram according to the first exemplary embodiment of the present invention.

FIG. 9 is a diagram illustrating an example of a set of pieces of statistical data according to the first exemplary embodiment of the present invention.

FIG. 10 is a diagram illustrating an example of a comparison between two kinds of power usages according to the first exemplary embodiment of the present invention.

FIG. 11 is a diagram illustrating an example of a task start telegram according to a second exemplary embodiment of the present invention.

FIG. 12 is a diagram illustrating an example of a task termination telegram according to the second exemplary embodiment of the present invention.

FIG. 13 is a diagram illustrating an example of a set of pieces of statistical data according to a third exemplary embodiment of the present invention.

FIG. 14 is a diagram illustrating an example of a comparison between two kinds of power usages according to the third exemplary embodiment of the present invention.

FIG. 16 is a diagram illustrating an example of task usage information according to a fourth exemplary embodiment of the present invention.

FIG. 17 is a diagram illustrating an example of sets of pieces of statistical data according to the fourth exemplary embodiment of the present invention.

FIG. 18 is a diagram illustrating an example of a comparison between two kinds of power usages according to a fourth exemplary embodiment of the present invention.

EXEMPLARY EMBODIMENT (First Exemplary Embodiment)

A first exemplary embodiment of the present invention will be described.

First, a configuration of the first exemplary embodiment of the present invention will be described.

Figure 2:
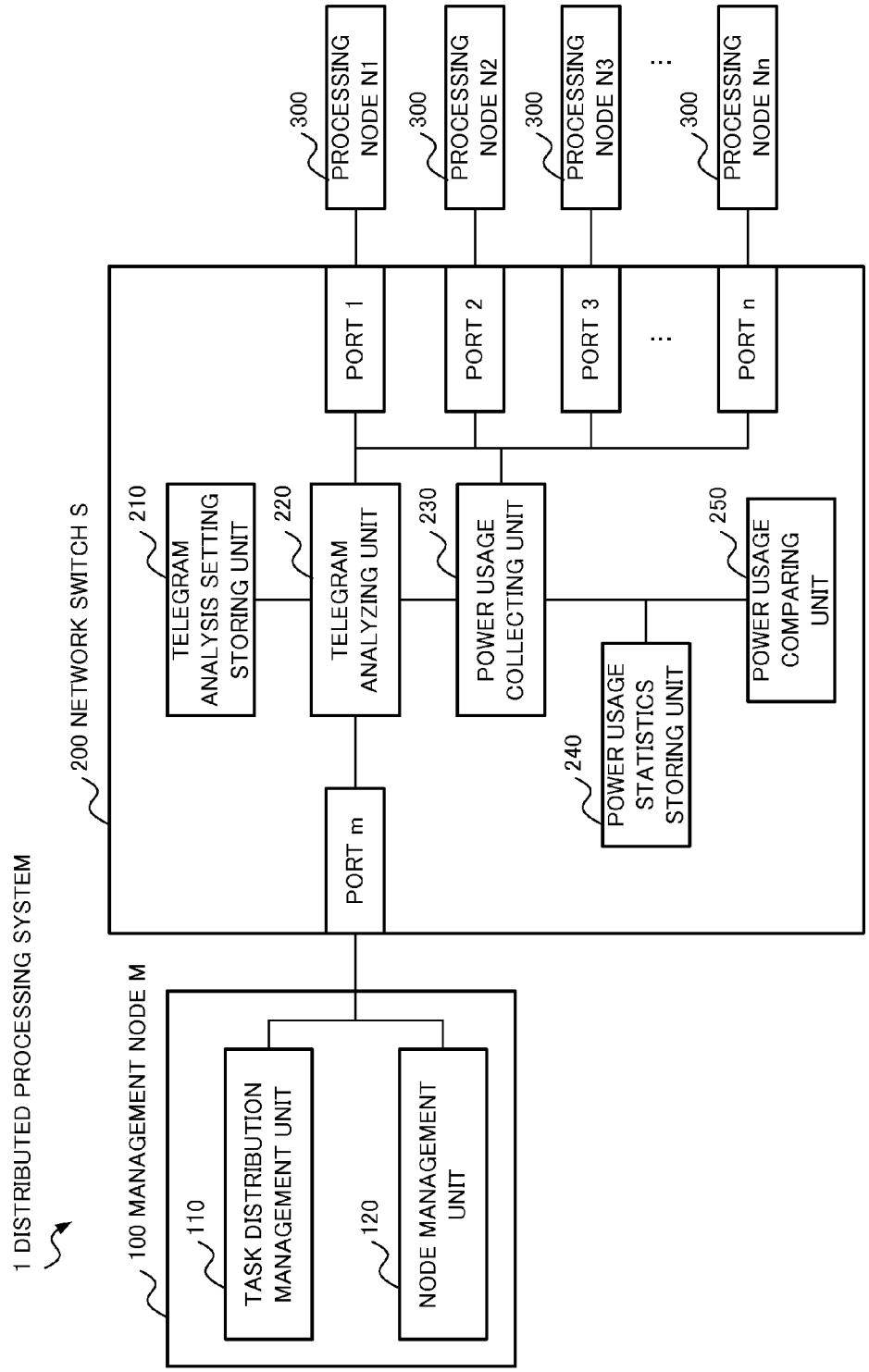
FIG. 2 is a block diagram illustrating a configuration of a distributed processing system 1 according to the first exemplary embodiment of the present invention.

FIG. 2 is a block diagram illustrating a configuration of a distributed processing system 1 according to the first exemplary embodiment of the present invention.

Referring to FIG. 2, the distributed processing system 1 includes a management node 100 "M", a network switch (or a monitoring device) 200 "S", and processing nodes 300 "N1" to "Nn". Here, a sign within quotation marks following a reference sign denotes an identifier.

The distributed processing system 1 is an exemplary embodiment of an information processing system according to an aspect of the present invention.

The management node 100 and each of the processing nodes 300 are connected to each other via the network switch 200. The network switch 200 receives a telegram from each of the management node 100 and the processing nodes 300, and transfers the received telegram to a port corresponding to a destination of the received telegram. Further, the network switch 200 supplies electric power to each of the processing nodes 300 via a corresponding port in a way conforming to a specification of a standard, such as power over Ethernet (registered trademark) (PoE). Further, each of the processing nodes 300 may be supplied with electric power from a power supply unit (not illustrated) via a corresponding power supply port of the power supply unit.

The Management node 100 includes a task distribution management unit 110 and a node management unit 120.

The task distribution management unit 110 divides a source task targeted for processing by the distributed processing system 1 into a plurality of tasks, and requests some of the processing nodes 300 to execute the individual divided tasks. The task distribution management unit 110 manages results of execution of the individual divided tasks.

FIG. 5 is a diagram illustrating an example of a telegram (a task start telegram) for instructing a start of execution of an allocated task, in the first exemplary embodiment of the present invention. As shown in the example of FIG. 5, the task start telegram includes a destination denoted by an identifier of a processing node 300 which is requested to execute an allocated task, as well as a command for instructing a start of execution of the allocated task.

The task distribution management unit 110 requests a processing node 300 to execute an allocated task by using the task start telegram shown in FIG. 5.

FIG. 6 is a diagram illustrating an example of a telegram (a task termination telegram) for notifying of a termination of execution of an allocated task, in the first exemplary embodiment of the present invention. As shown in the example of FIG. 6, the task termination telegram includes a transmission source denoted by an identifier of a processing node 300 having executed an allocated task; a command for instructing a termination of the execution of the allocated task; and a result of the execution of the allocated task.

Upon termination of execution of an allocated task, having been requested by the management node 100, the processing node 300 transmits a result of the execution of the allocated task to the management node 100 by using the task termination telegram shown in FIG. 6.

The node management unit 120 manages a state of each of the processing nodes 300.

The network switch 200 includes a telegram analysis setting storing unit 210, a telegram analyzing unit 220, a power usage collecting unit 230, a power usage statistics storing unit 240, and a power usage comparing unit 250.

The telegram analysis setting storing unit 210 stores therein telegram patterns for use in detection of the task start telegram and the task termination telegram. The telegram patterns are set in advance by an administrator or the like.

FIG. 7 is a diagram illustrating an example of a telegram pattern of the task start telegram in the first exemplary embodiment of the present invention. FIG. 8 is a diagram illustrating an example of a telegram pattern of the task termination telegram in the first exemplary embodiment of the present invention.

In the example shown in FIG. 7, command="start task" is set as the telegram pattern of the task start telegram; and in the example shown in FIG. 8, command="terminate task" is set as the telegram pattern of the task termination telegram. In this case, when a value set in a command field of a telegram is "start task", the telegram is determined as the task start telegram; and when a value set in a command field of a telegram is "terminate task", the telegram is determined as the task termination telegram.

The telegram analyzing unit 220 analyzes each of telegrams having been received from the management node 100 and the processing nodes 300 on the basis of the telegram patterns stored in the telegram analysis setting storing unit 210 to detect a task start telegram and a task termination telegram. Upon detection of the task start telegram, the telegram analyzing unit 220 transmits a command "start collections of power usages" (hereinafter, referred to as a command "start collections"), in which a processing node 300, which is indicated as a destination in the detected task start telegram, is designated, to the power usage collecting unit 230 to instruct execution of the command "start collections". Upon detection of the task termination telegram, the telegram analyzing unit 220 transmits a command "terminate collections of power usages" (hereinafter, referred to as a command "terminate collections"), in which a processing node 300, which is indicated as a transmission source in the detected task termination telegram, is designated, to the power usage collecting unit 230 to instruct execution of the command "terminate collections".

Upon reception of the command "start collections", the power usage collecting unit 230 starts collection of power usages of a processing node 300 which is designated by the received command "start collections", and continues it until a reception of a command "terminate collections" for instructing a completion of the collection of power usages of the processing node 300. Further, the power usage collecting unit 230 generates/updates a set of pieces of power usage statistical data on the basis of a time series of collected power usages. The power usage collecting unit 230 collects, for example, power usages of electric power which is supplied in a way conforming to PoE. Further, the power usage collecting unit 230 may collect power usages of electric power supplied from a power supply unit (not illustrated).

The power usage statistics storing unit 240 stores therein the set of pieces of power usage statistical data in association with an identifier of the processing node 300.

The power usage comparing unit 250 compares a newly collected power usage of a processing node 300 having been designated by a command "start collections" with a piece of statistical data included in the set of pieces of statistical data which is stored in the power usage statistics storing unit 240 and which relates to the processing node 300, and thereby detects an abnormal state of an allocated task in the processing node 300. The power usage comparing unit 250 notifies a predetermined notification destination of the detected abnormal state of the allocated task in the processing node 300.

Each of the processing nodes 300 executes a task whose execution has been requested by the management node 100.

In addition, each of the management node 100, the network switch 200, and the processing nodes 300 may be a computer which includes a central processing unit (CPU) and a storage medium storing programs therein, and which operates under the control based on the programs. The telegram analysis setting storing unit 210 and the power usage statistics storing unit 240, which constitute the network switch 200, may be each constituted by a corresponding one of independent storage media, or may be constituted by a single storage medium common thereto.

Further, the telegram analysis setting storing unit 210, the telegram analyzing unit 220, the power usage collecting unit 230, the power usage statistics storing unit 240, and the power usage comparing unit 250 may be included in one or more devices different from the network switch 200.

Figure 3:
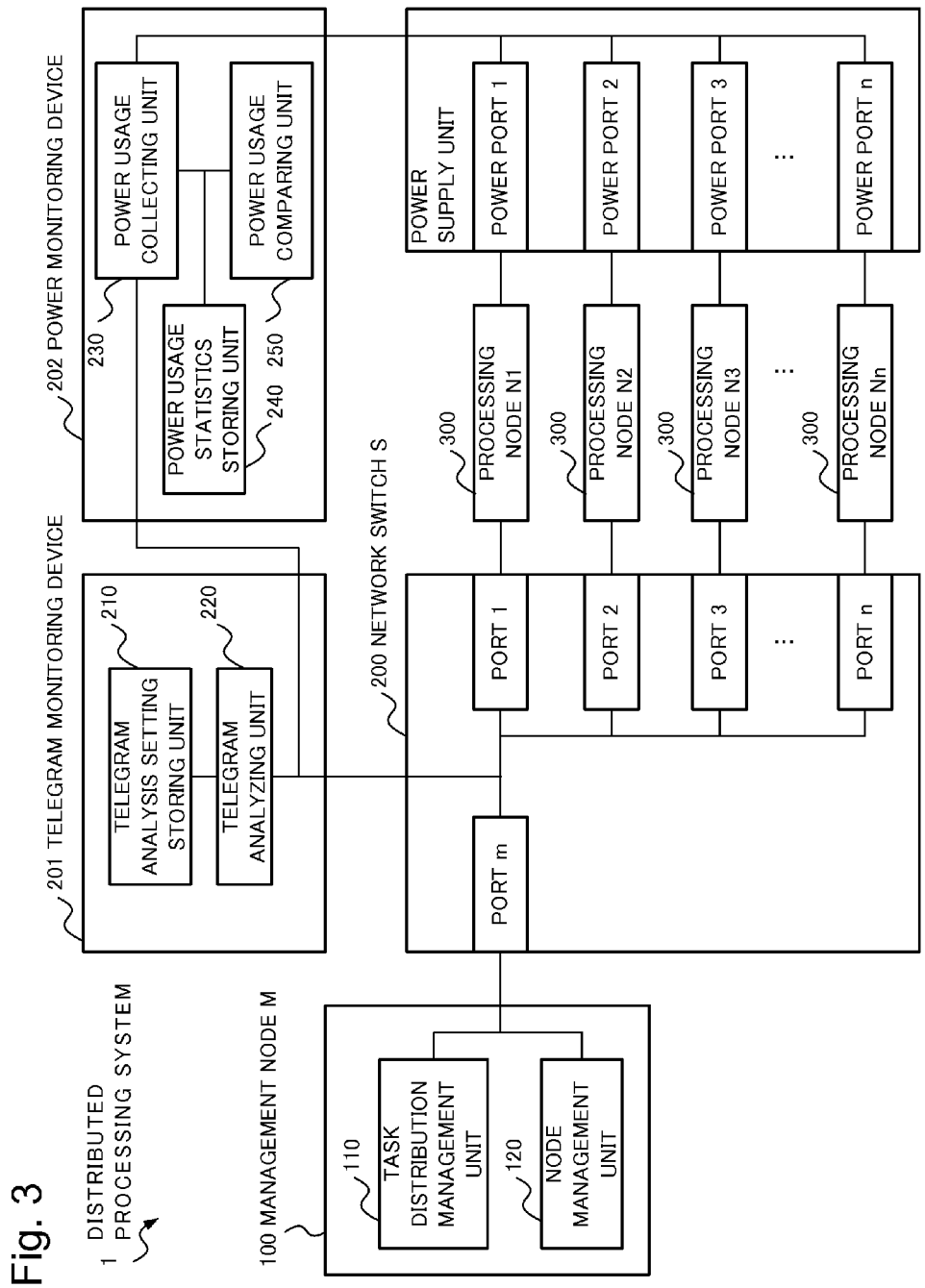
FIG. 3 is a block diagram illustrating another configuration of the distributed processing system 1 according to the first exemplary embodiment of the present invention.

FIG. 3 is a block diagram illustrating another configuration of the distributed processing system 1 according to the first exemplary embodiment of the present invention.

Referring to FIG. 3, the distributed processing system 1 includes a management node 100, a network switch 200, processing nodes 300, a telegram monitoring device 201, and a power monitoring device 202. The telegram monitoring device 201 includes a telegram analysis setting storing unit 210 and a telegram analyzing unit 220. The power monitoring device 202 includes a power usage collecting unit 230, a power usage statistics storing unit 240, and a power usage comparing unit 250.

Next, operation of the first exemplary embodiment of the present invention will be described.

It is supposed, here, that telegram patterns like those shown in FIGS. 7 and 8 are stored in the telegram analysis setting storing unit 210. All of the processing nodes 300 "N1" to "Nn" are each supposed to be in a state of being capable of executing an allocated task.

Figure 4:
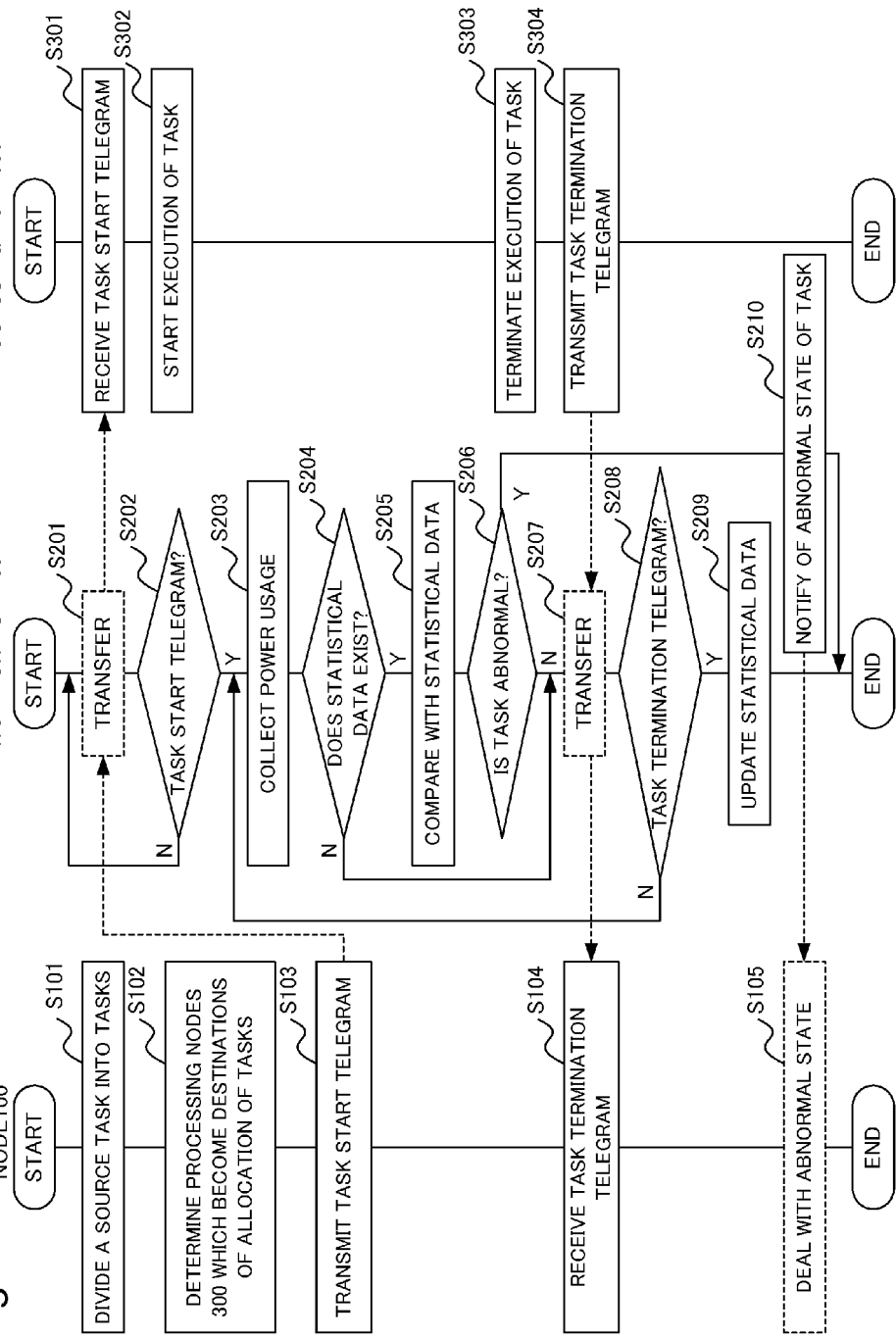
FIG. 4 is a flowchart illustrating operation of the distributed processing system 1 according to the first exemplary embodiment of the present invention.

FIG. 4 is a flowchart illustrating operation of the distributed processing system 1 in the first exemplary embodiment of the present invention.

When a user or the like instructs execution of a processing target source task, the task distribution management unit 110 of the management node 100 divides the source task into a plurality of tasks (step S101).

The task distribution management unit 110 determines processing nodes 300 which become destinations of allocation of the individual divided tasks (step S102).

Here, the task distribution management unit 110 selects and determines processing nodes 300 which become destinations of allocation of the individual divided tasks, from among identifiers of processing nodes 300 each of which is in a state of being capable of executing an allocated task and which have been acquired from the node management unit 120. In addition, a method for determining processing nodes 300 may be optionally selected, provided that, as a result, a processing node 300 in a state of being capable of executing an allocated task can be determined.

For example, the task distribution management unit 110 divides a source task into two tasks, and allocates each of the two tasks to a corresponding one of processing nodes 300 "N1" and "N2".

The task distribution management unit 110 generates task start telegrams and transmits them to the network switch 200 (step S103). Here, the task distribution management unit 110 sets an identifier of each of the processing nodes 300, which have been determined as allocation destinations of the individual divided tasks, as a destination of a corresponding one of the task start telegrams.

For example, the task distribution management unit 110 sets each of identifiers "N1" and "N2" of the processing nodes 300 "N1" and "N2" as a destination of a corresponding one of task start telegrams (its format is shown in FIG. 5), and then, transmits the task start telegrams.

The network switch 200 transfers each of received task start telegrams to a processing node 300 designated by a destination indicated by a corresponding one of the received task start telegrams (step S201).

For example, the network switch 200 transfers each of received task start telegrams to a corresponding one of the processing nodes 300 "N1" and "N2", which are each designated by a destination indicated by a corresponding one of the received task start telegrams.

Upon reception of a task start telegram (step S301), the processing node 300 starts execution of the allocated task (step S302).

For example, each of the processing nodes 300 "N1" and "N2" starts execution of the allocated task.

The telegram analyzing unit 220 of the network switch 200 determines whether or not any task start telegram has been received, on the basis of the telegram pattern stored in the telegram analysis setting storing unit 210 (step S202).

For example, the telegram analyzing unit 220 determines whether or not any task start telegram has been received, on the basis of the telegram pattern shown in FIG. 7.

In the case where a task start telegram has been received in step S202 (step S202/Y), the telegram analyzing unit 220 transmits a command "start Collections", in which a processing node 300, which is indicated as a destination in the task start telegram, is designated, to the power usage collecting unit 230 to instruct execution of the command "start collections".

For example, the telegram analyzing unit 220 transmits commands "start collections", in each of which a corresponding one of the processing nodes 300 "N1" and "N2" is designated, to the power usage collecting unit 230 to instruct execution of the commands "start collections".

The power usage collecting unit 230 collects a power usage of a processing node 300 having been designated by the command "start collections" (step S203).

For example, the power usage collecting unit 230 collects a power usage of each of the processing nodes 300 "N1" and "N2".

The power usage comparing unit 250 determines whether or not a set of pieces of statistical data relating to a processing node 300, for which the power usage has been collected, exists in the power usage statistics storing unit 240 (step S204).

In the case where, in step S204, the set of pieces of statistical data exists (step S204/Y), the power usage comparing unit 250 compares the collected power usage with a piece of statistical data included in the set of pieces of statistical data, and thereby detects an abnormal state of the allocated task (steps S205 and S206), as described below. In contrast, in the case where, in step S204, the set of pieces of statistical data does not exist (step S204/N), the processes in steps S205 and S206 are skipped.

For example, in an initial state, since any set of pieces of statistical data does not exist, the processes in steps S205 and S206 are skipped.

The telegram analyzing unit 220 determines whether or not any task termination telegram has been received, on the basis of the telegram pattern stored in the analysis setting storing unit 210 (step S208).

For example, the telegram analyzing unit 220 determines whether or not any task termination telegram has been received, on the basis of the telegram pattern shown in FIG. 8.

In the case where, in step S208, any task termination telegram has not been received (step S208/N), the processes from step S203 are repeatedly performed at constant length sampling intervals.

Upon termination of execution of the allocated task (step S303), the processing node 300 generates a task termination telegram, and transmits it to the network switch 200 (step S304).

For example, the processing node 300 "N1" sets "N1" into a transmission source field of a task termination telegram shown in FIG. 6, and transmits this task termination telegram, and similarly, the processing node 300 "N2" sets "N2" into a transmission source field of a task termination telegram, and transmits this task termination telegram.

The network switch 200 transfers a received task termination telegram to the management node 100 (step S207).

For example, the network switch 200 transfers task termination telegrams having been received from the processing nodes 300 "N1" and "N2" to the management node 100.

In the case where, in step S208, a termination telegram has been received (step S208/Y), the telegram analyzing unit 220 transmits a command "terminate collections", in which a processing node 300, which is indicated as a transmission source by the received task termination telegram, is designated, to the power usage collecting unit 230 to instruct execution of the command "terminate collections".

For example, the telegram analyzing unit 220 transmits commands "terminate collections", in each of which a corresponding one of the processing nodes 300 "N1" and "N2" is designated, to the power usage collecting unit 230 to instruct execution of the commands "terminate collections".

The power usage collecting unit 230 updates the set of pieces of statistical data which is stored in the power usage statistics storing unit 240 and which relates to the processing node 300 designated in the received command "terminate collections" (step S209).

FIG. 9 is a diagram illustrating an example of a set of pieces of statistical data in the first exemplary embodiment of the present invention. As shown in the example of FIG. 9, the set of pieces of statistical data is generated for each processing node 300. The set of pieces of statistical data includes, as a value (a statistical value), an average value of power usages for each of sampling intervals starting at a beginning of execution of an allocated task.

For example, the power usage collecting unit 230 updates a set of pieces of statistical data relating to the processing node 300 "N1" such as shown in FIG. 9.

In the case where, in step S204, the set of pieces of statistical data exists (step S204/Y), the power usage comparing unit 250 compares the power usage having been collected in step S202 with a piece of statistical data included in the set of pieces of statistical data relating the processing node 300, and thereby detects an abnormal state of the allocated task (steps S205), For example, when the management node 100 has allocated each of divided tasks to a corresponding one of the processing nodes 300 "N1" and "N2" again, each of the processing nodes 300 "N1" and "N2" starts execution of the allocated task. The power usage collecting unit 230 of the network switch 200 collects power usages of each of the processing nodes 300 "N1" and "N2" at constant-length sampling intervals. Further, for each of the processing nodes 300, the power usage comparing unit 250 compares, for each of the sampling intervals, the collected power usage with a value of a piece of statistical data (an average value) included in the updated set of pieces statistical data.

FIG. 10 is a diagram illustrating an example of a comparison between two kinds of power usages in the first exemplary embodiment of the present invention.

In the example shown in FIG. 10, there is illustrated, for each sampling interval, a difference between a collected power usage and a value of a piece of statistical data (an average value) with respect to the processing node 300 "N1". Further, in the case where a difference does not fall within a predetermined range (a determination range), it is determined that an abnormal state of the allocated task has occurred.

For example, it is supposed, here, that the determination range is "a range from −20% to +20%" relative to a value of each piece of statistical data. In the case where, at a sampling interval 1, a collected power usage of the processing node 300 "N1" is "45", a difference with a value of a piece of statistical data (an average value) "50" is "−10%". This value falls within the determination range, and thus, the power usage comparing unit 250 determines that the allocated task is being normally executed.

Here, for example, it is supposed that a failure occurs in an input/output (I/O) device electrically connected to the processing node 300 "N1", and this failure causes the allocated task being executed in the processing node 300 "N1" to remain in an I/O waiting state. In the case where, in such an I/O waiting state, the CPU is implemented so as not to consume electric power, the power usage of the processing node 300 becomes smaller than a power usage of the processing node 300 in which the allocated task is being normally executed.

For example, in the case where, at a sampling interval 3, a collected power usage of the processing node 300 "N1" is "30", a difference with a value of a piece of statistical data (an average value) "12" is "+75%". This value does not fall within the determination range, and thus, the power usage comparing unit 250 determines that an abnormal state of the allocated task has occurred in the processing node 300 "N1".

In contrast, in the case where processing of the allocated task falls in an infinite loop due to an abnormal data value, an application bug, or the like, the power usage of the processing node 300 becomes larger than a power usage of the processing node 300 in which the allocated task is being normally executed. In this case, it is also possible to detect an abnormal state of the allocated task by determining whether or not the difference falls within the determination range.

In the case where an abnormal state of the allocated task has been detected (step S206/Y), the power usage comparing unit 250 notifies a predetermined notification destination, such as the management node 100, of the abnormal state of the allocated task in the processing node 300 (step S210).

For example, the power usage comparing unit 250 notifies the management node 100 of the abnormal state of the allocated task in the processing node 300 "N1".

Upon reception of the notification for notifying of the abnormal state, the management node 100 deals with the abnormal state by, for example, canceling tasks having been allocated to the processing node 300 for which the abnormal state has been detected and reallocating the tasks to different normally operating processing nodes 300 (step S105). Further, the management node 100 may output the identifier of the processing node 300, for which the abnormal state has been detected, through an indication to users or writing into a log file or the like.

Simultaneously with completion of the above process, the operation of this the exemplary embodiment of the present invention is completed.

In addition, in the first exemplary embodiment of the present invention, as a piece of statistical data relating to a power usage, an average value of power usages for each sampling interval is employed, and in the case where a difference between a newly collected power usage and the average value does not fall within the determination range, it is determined that an abnormal state of an allocated task has occurred. Nevertheless, any other piece of statistical data which enables determination of an abnormal state of an allocated task may be used. Further, in the comparison between a newly collected power usage and a value of a piece of statistical data, any other method which enables determination of an abnormal state of an allocated task may be used.

Figure 1:
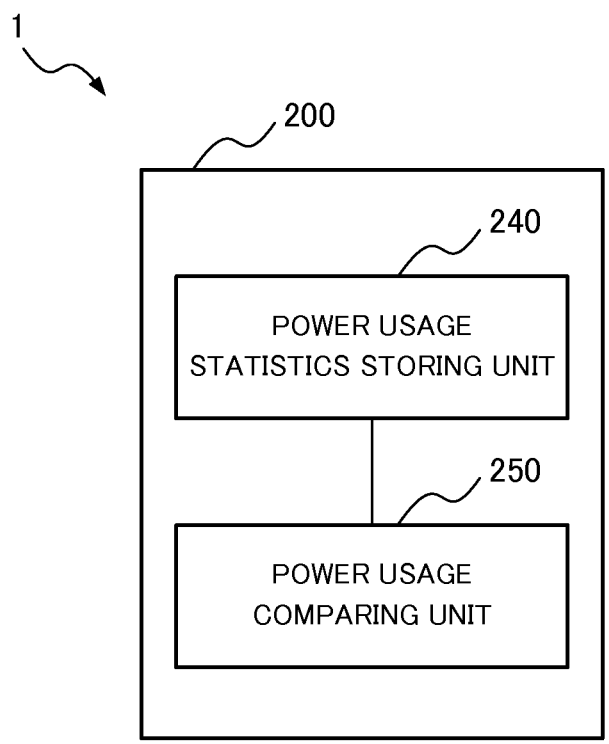
FIG. 1 is a block diagram illustrating a characteristic configuration of a first exemplary embodiment of the present invention.

Next, a characteristic configuration of the first exemplary embodiment of the present invention will be described. FIG. 1 is a block diagram illustrating a characteristic configuration of the first exemplary embodiment of the present invention.

Referring to FIG. 1, a distributed processing system (an information processing system) 1 includes a power usage statistics storing unit 240 and a power usage comparing unit 250.

The power usage statistics storing unit 240 stores a statistical value representing a power usage of a processing node in a state of executing a task.

The power usage comparing unit 250 compares a newly collected power usage of the processing node in a state of executing the task with the statistical value representing a power usage of the processing node, which is stored in the power usage statistics storing unit 250, to detect an abnormal state of the task in the processing node.

According to the first exemplary embodiment of the present invention, it is possible to correctly detect an abnormal state of an allocated task in each of processing nodes without using any resource of the processing node.

This is because the power usage comparing unit 250 compares a power usage of a processing node 300 in which a task allocated thereto has been executed with a power usage statistical value which is related to the processing node 300 and which is stored in the power usage statistics storing unit 240, and thereby detects an abnormal state of the allocated task in the processing node 300.

(Second Exemplary Embodiment)

Next, a second exemplary embodiment of the present invention will be described.

The second exemplary embodiment of the present invention is different from the first exemplary embodiment of the present invention in that, for each pair of a processing node 300 and an allocated task, a set of pieces of power usage statistical data is generated and used in comparison.

When a source task is divided into tasks, the task distribution management unit 110 of the management node 100 gives an identical identifier to each of at least one task having the same workload. For example, in enterprise batch processing, each of tasks included in an identical batch job has an approximately equal workload, and thus, a name of the batch job can be given to each of the tasks as an identifier thereof.

FIG. 11 is a diagram illustrating an example of a task start telegram in the second exemplary embodiment of the present invention. The task start telegram further includes an identifier of an allocated task to be executed in a processing node 300.

The task distribution management unit 110 designates the allocated task to be executed, by using a task start telegram shown in FIG. 11.

FIG. 12 is a diagram illustrating an example of a task termination telegram in the second exemplary embodiment of the present invention. The task termination telegram further includes an identifier of an allocated task having been executed in a processing node 300.

The processing node 300 notifies of a task whose execution has been terminated, by using a task termination telegram shown in FIG. 12.

The telegram analyzing unit 220 of the network switch 200 transfers a command "start collections", in which a processing node 300 and an allocated task which are indicated in a received task start telegram are designated, to the power usage collecting unit 230 to instruct execution of the command "start collections". Similarly, the telegram analyzing unit 220 transfers a command "terminate collections", in which a processing node 300 and a task which are indicated in a received task termination telegram are designated, to the power usage collecting unit 230 to instruct execution of the command "terminate collections".

The power usage collecting unit 230 collects power usages of the processing node 300 having been designated in the command "start collections". The power usage collecting unit 230 generates/updates a set of pieces of power usage statistical data with respect to a pair of the processing node 300 and the task having been designated in the command "start collections".

The power usage statistics storing unit 240 stores therein the set of pieces of power usage statistical data in association with a pair of an identifier of the processing node 300 and an identifier of the allocated task.

Further, the power usage comparing unit 250 compares a newly collected power usage of a processing node 300 having been designated in the command "start collections" with a value of a piece of statistical data (an average value) included in the set of pieces of statistical data which relates to a pair of the processing node 300 and the allocated task having been designated in the command "start collections" and which is stored in the power usage statistics storing unit 240, and thereby detects an abnormal state of the allocated task in the processing node 300.

For example, when the management node 100 has allocated a task "T1" to a processing node 300 "N1", the power usage collecting unit 230 of the network switch 200 generates a set of pieces of statistical data relating to a pair of the processing node 300 "N1" and the task "T1".

Further, when the management node 100 allocates the task "T1" to the processing node 300 "N1" again, the power usage comparing unit 250 of the network switch 200 compares a newly collected power usage of the processing node 300 "N1" with a value of a piece of statistical data included in the set of pieces of statistical data relating to the pair of the processing node 300 "N1" and the task "T1".

In addition, although, in the second exemplary embodiment of the present invention, the management node 100 has allocated only one task to the same processing node 300, in the case where the management node 100 allocates a plurality of tasks to the same processing node 300, the power usage collecting unit 230 of the network switch 200 may generate/update a set of pieces of statistical data relating to a combination of the processing node 300 and the plurality of tasks.

In this case, the power usage comparing unit 250 compares a newly collected power usage of a corresponding processing node 300 with a value of a piece of statistical data (an average value) included in a set of pieces of statistical data relating to the combination of the processing node 300 and the plurality of tasks, and thereby detects an abnormal state of the allocated tasks in the processing node 300.

According to the second exemplary embodiment of the present invention, even when a plurality of tasks whose sets of pieces of statistical data are mutually different are executed in each of processing nodes, it is possible to detect an abnormal state of the task in the processing node.

This is because the power usage collecting unit 230 generates/updates a set of pieces of statistical data relating to a processing node 300 and the each task, and the power usage comparing unit 250 compares a newly collected power usage amount of the processing node 300 with a value of a piece of statistical data (an average value) included in the set of pieces of statistical data relating to the pair of the processing node 300 and the each task.

(Third Exemplary Embodiment)

Next, a third exemplary embodiment of the present invention will be described.

The third exemplary embodiment of the present invention is different from the first exemplary embodiment of the present invention in that the determination range for use in determination of an abnormal state of each of allocated tasks in a processing node 300 is corrected in accordance with the number of the allocated tasks executed in the processing node 300.

In the case where, when having detected a task start telegram, at least one allocated task is being executed in a processing node 300 which is designated as a destination of the detected task start telegram, the telegram analyzing unit 220 of the network switch 200 notifies a power usage comparing unit 250 of a message "occurrence of an additional load" in substitution for the transmission of the command "start collections" to the power usage collecting unit 230. Further, when having detected a task termination telegram, in the case where a plurality of tasks being executed exist in a processing node 300 which is a transmission source of the detected task termination telegram, the telegram analyzing unit 220 notifies the power usage comparing unit 250 of a message "termination of an additional load" in substitution for the transmission of the command "terminate collections" to the power usage collecting unit 230.

The power usage comparing unit 250 includes an additional load counter whose initial value is "0". Upon reception of the message "occurrence of an additional load" from the telegram analyzing unit 220, the power usage comparing unit 250 increments the additional load counter by "1". Further, upon reception of the message "termination of an additional load" from the telegram analyzing unit 220, the power usage comparing unit 250 decrements the additional load counter by "1".

Further, the power usage comparing unit 250 corrects a determination range for use in determination of an abnormal state of an allocated task in accordance with a value of the additional load counter. For example, in the case where the determination range is "a range from –P0% to +P0% relative to a value of a piece of statistical data", the power usage comparing unit 250 corrects the determination range such that the determination range is broadened in a positive direction in accordance with a value of the additional load counter and becomes "a range from –P0% to +(P0×(the value of the additional load counter +"1")) % relative to the value of the piece of statistical data".

Next, a specific example of operation of the third exemplary embodiment of the present invention will be described.

FIG. 13 is a diagram illustrating an example of a set of pieces of statistical data in the third exemplary embodiment of the present invention.

It is supposed, here, that a set of pieces of statistical data like that shown in FIG. 13 is stored in the power usage statistics storing unit 240. Further, it is supposed that an initial value of the determination range is "±20% relative to a value of a piece of statistical data (an average value)".

FIG. 14 is a diagram illustrating an example of a comparison between two kinds of power usages in the third exemplary embodiment of the present invention.

First, the management node 100 allocates a first task to a processing node 300 "N1".

At a sampling interval 1 shown in FIG. 14, a value of the additional load counter is "0" (an initial value), and thus, the determination range is "a range from –20% to +20% relative to a value of a piece of statistical data (an average value)" (this range will be referred to as an initial determination range). At the sampling interval 1, a power usage "55" of the processing node 300 "N1" is collected. Here, a difference between the collected power usage and a value of a piece of statistical data (an average value) "50" is "+10%". Since this value falls within the above determination range, the power usage comparing unit 250 determines that the allocated task is being normally executed.

At a sampling interval 2, the management node 100 allocates a second task to the processing node 300 "N1". The telegram analyzing unit 220 notifies the power usage comparing unit 250 of a message "occurrence of an additional load". The power usage comparing unit 250 increments the additional load counter by "1", and corrects the determination range into "a range from –20% to +40% relative to a value of a piece of statistical data (an average value)". At the sampling interval 2, a power usage is increased by execution of the second task and, as a result, a power usage "140" of the processing node 300 "N1" is collected. Here, a difference between the collected power usage and a value of a piece of statistical data (an average value) "100" is "+40%". This value is determined as a value which does not fall within the initial determination range. This value, however, falls within the corrected determination range, and thus, the power usage comparing unit 250 determines that the allocated task is being normally executed.

At a sampling interval 3, the management node 100 allocates a third task to the processing node 300 "N1". The telegram analyzing unit 220 notifies the power usage comparing unit 250 of a message "occurrence of an additional load". The power usage comparing unit 250 increments the additional load counter by "1", and corrects the determination range into "a range from–20% to +60% relative to a value of a piece of statistical data (an average value)". At the sampling interval 3, a power usage is increased by execution of the third task and, as a result, a power usage "190" of the processing node 300 "N1" is collected. Here, a difference between the collected power usage and a value of a piece of statistical data (an average value) "120" is "+59%". This value is also determined as a value which does not fall within the initial determination range. This value, however, falls within the corrected determination range, and thus, the power usage comparing unit 250 determines that the allocated task is being normally executed.

At a sampling interval 4, the processing node 300 "N1" terminates the second and third allocated tasks. The telegram analyzing unit 220 notifies the power usage comparing unit 250 of messages "termination of an additional load". The power usage comparing unit 250 decrements the additional load counter by two, and returns the determination range to "a range from −20% to +20% relative to a value of a piece of statistical data (an average value)" (i.e., the initial termination range). At the sampling interval 4, a power usage is decreased by the termination of the two tasks and, as a result, a power usage "45" of the processing node 300 "N1" is collected. Here, a difference between the collected power usage and a value of a piece of statistical data (an average value) "50" is "−10%". This value also falls within the determination range, and thus, the power usage comparing unit 250 determines that the allocated task is being normally executed.

At a sampling interval 5, a power usage "15" of the processing node 300 "N1" is collected. Here, a difference between the collected power usage and a value of a piece of statistical data "50" is "−70%". This value does not fall within the determination range, and thus, the power usage comparing unit 250 determines that the allocated task is in an abnormal state.

According to the third exemplary embodiment of the present invention, even when a plurality of allocated tasks are executed in each of the processing nodes 300, it is possible to detect an abnormal task execution state in the processing node 30 by using a set of pieces of statistical data relating to execution of only one task.

This is because the power usage comparing unit 250 corrects a determination range for use in determination of an abnormal task execution state in a processing node 300 in accordance with the number of tasks being executed in the processing node 300.

(Fourth Exemplary Embodiment)

Next, a fourth exemplary embodiment of the present invention will be described.

The fourth exemplary embodiment of the present invention is different from the second exemplary embodiment of the present invention in that, when an at least one node other than a processing node is used by allocated tasks being executed in the processing node, through the use of power usages of each of the at least one other node, an abnormal state of the each of the at least one other node is detected.

Figure 15:
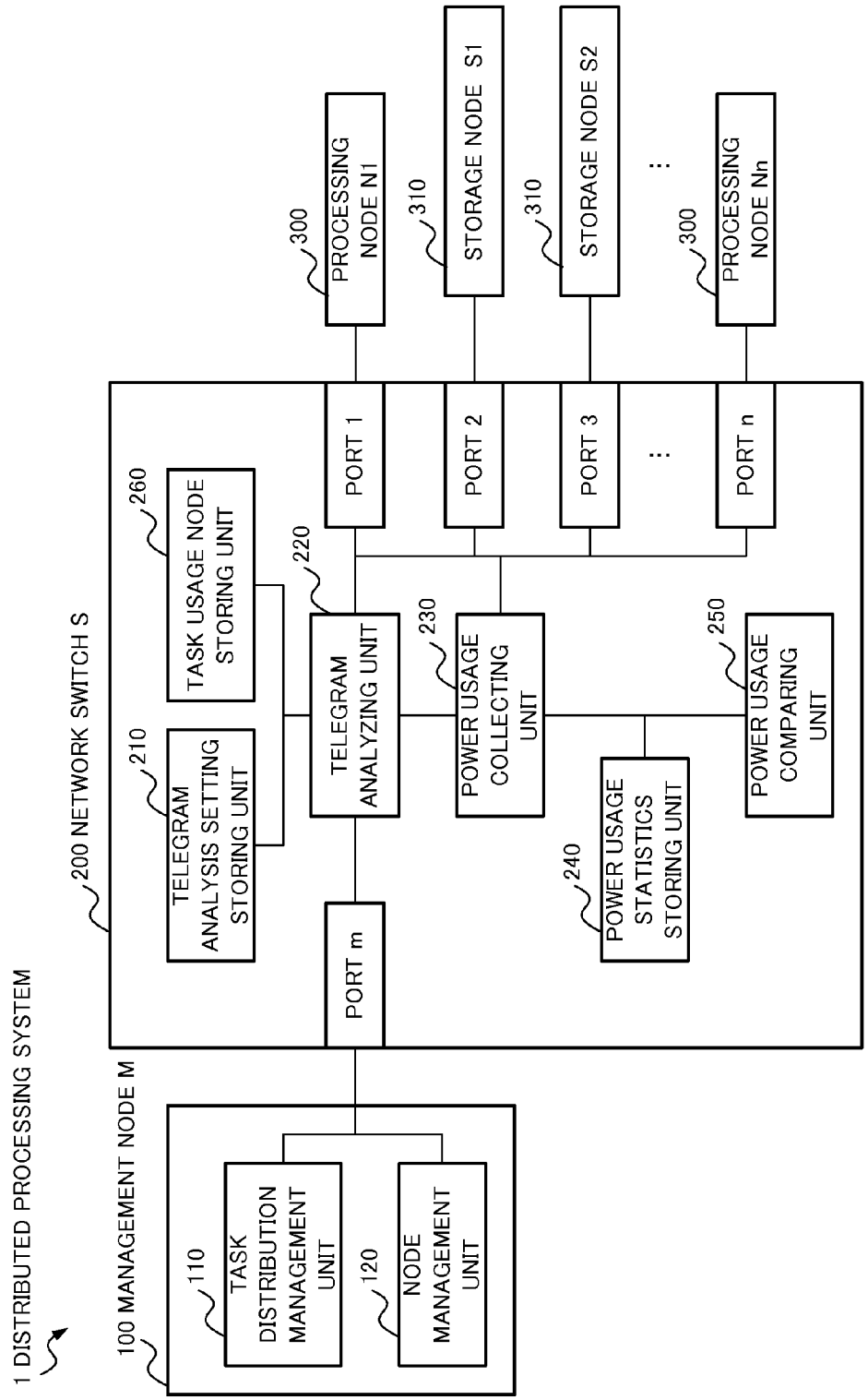
FIG. 15 is a block diagram illustrating a configuration of a distributed processing system 1 according to a fourth exemplary embodiment of the present invention.

FIG. 15 is a block diagram illustrating a configuration of a distributed processing system 1 in the fourth exemplary embodiment of the present invention.

Referring to FIG. 15, the distributed processing system 1 further includes storage nodes 310 "S1" and "S2" as other nodes. The processing nodes 300 and the storage nodes 310 are mutually connected via the network switch 200. The network switch 200 also supplies electric power to the storage nodes 310 via ports.

The network switch 200 further includes a task usage node storing unit 260. The task usage node storing unit 260 stores therein a set of task usage node information which indicate at least one other node used by the allocated tasks. The set of task usage node information is set in advance by an administrator or the like.

FIG. 16 is a diagram illustrating an example of task usage node information in the fourth exemplary embodiment of the present invention. In the set of task usage node information, an identifier of each allocated task is associated with an identifier of each of at least one other node used by the each allocated task.

In the example shown in FIG. 16, an identifier of each allocated task is associated with an identifier of each of at least one storage node 310, which is used by the each allocated task as, for example, a storage node for storing therein data processed by the each allocated task.

The telegram analyzing unit 220 of the network switch 200 transmits a command "start collections", in which a processing node 300 and an allocated task, which are indicated in a received task start telegram, and at least one other node are designated, to the power usage collecting unit 230 to instruct execution of the command "start collections". Similarly, the telegram analyzing unit 220 transmits a command "terminate collections", in which a processing node 300 and an allocated task, which are indicated in a received task completion telegram, and at least one other node are designated, to the power usage collecting unit 230 to instruct execution of the command "terminate collections".

The power usage collecting unit 230 collects power usages of each of the processing node 300 and the at least one other node which having been designated by the received command "start collections". The power usage collecting unit 230 generates/updates a set of pieces of power usage statistical data relating to a pair of the processing node 300 and the allocated task which have been designated by the command "start collections". In addition thereto, the power usage collecting unit 230 generates/updates a set of pieces of power usage statistical data relating to a pair of the allocated task and each of the at least one other node having been designated by the command "start collections".

The power usage statistics storing unit 240 stores therein the set of pieces of power usage statistical data in association with a pair of an identifier of the processing node 300 and an identifier of the allocated task. In addition thereto, the power usage statistics storing unit 240 stores therein the set of pieces of power usage statistical data in association with a pair of an identifier of the allocated task and an identifier of each of the at least one other node.

The power usage comparing unit 250 compares a newly collected power usage of the processing node 300 having been designated by the command "start collections" with a value of a piece of statistical data (an average value) included in the set of pieces of statistical data, which relates to the pair of the processing node 300 and the allocated task having been designated by the command "start collections" and which is stored in the power usage statistics storing unit 240, and thereby detects an abnormal state of the allocated task in the processing node 300. Further, the power usage comparing unit 250 compares a newly collected power usage of each of the at least one other node having been designated by the command "start collections" with a value of a piece of statistical data (an average value) included in the set of pieces of statistical data, which relates to the pair of the allocated task and the each other node, having been designated by the command "start collections" and which is stored in the power usage statistics storing unit 240, and thereby detects an abnormal state of the each other node.

Next, a specific example of operation of the fourth exemplary embodiment of the present invention will be described.

It is supposed, here, that task usage node information, shown in FIG. 16, is stored in the task usage node storing unit 260.

The management node 100 allocates the task "T1" to the processing node 300 "N1", and transmits a task start telegram. The telegram analyzing unit 220 of the network switch 200 acquires identifiers "S1" and "S2" of storage nodes 310 used by the task "T1" by referring to the task usage node information shown in FIG. 16. The Telegram analyzing unit 220 transmits a command "start collections", in which the processing node 300 "N1", the task "T1", and the storage nodes 310 "S1" and "S2" are designated, to the power usage collecting unit 230 to instruct execution of the command. The power usage collecting unit 230 collects a power usage of each of the processing node 300 "N1" and the storage nodes 310 "S1" and "S2".

FIG. 17 is a diagram illustrating an example of sets of pieces of statistical data in the fourth exemplary embodiment of the present invention.

As shown in FIG. 17, the power usage collecting unit 230 generates a set of pieces of statistical data associated with a pair of the processing node 300 "N1" and the task "T1"; a set of pieces of statistical data associated with a pair of the task "T1" and the storage node 310 "S1"; and a set of pieces of statistical data associated with a pair of the task "T1" and the storage node 310 "S2".

When the management node 100 has allocated the task "T1" to the processing node 300 "N1" again, the power usage comparing unit 250 of the network switch 200 compares, for each of the pair of the processing node 300 "N1" and the task "T1"; the pair of the task "T1" and the storage node 310 "S1"; and the pair of the task "T1" and the storage node 310 "S2", a newly collected power usage of a node constituting a corresponding one of the pairs, with a value of a piece of statistical data (an average value) included in a corresponding one of the above sets of pieces of statistical data, shown in FIG. 17.

FIG. 18 is a diagram illustrating an example of comparison of two kinds of power usages in the fourth exemplary embodiment of the present invention.

For example, at a sampling interval 4 shown in FIG. 18, a collected power usage of the processing node 300 "N1", a collected power usage of the storage node 310 "S1", and a collected power usage of the storage node 310 "S2" are "80", "15", and "90", respectively. Here, a difference between the collected power usage of the processing node 300 "N1" and a value of a piece of statistical data (average value) "100" is "−20%". This value falls within a determination range, and thus, the power usage comparing unit 250 determines that the task "T1" on the processing node 300 "N1" is being normally executed. Further, a difference between the collected power usage of the storage node 310 "S2" and a value of a piece of statistical data (average value) "90" is "0%". This value falls also within the determination range, and thus, the power usage comparing unit 250 determines that the storage node 310 "S2" is normal.

Meanwhile, a difference between the collected power usage of the storage node 310 "S1" and a value of a piece of statistical data (average value) "50" is "−70%". This value does not fall within the determination range, and thus, the power usage comparing unit 250 determines that the storage node 310 "S1" is in an abnormal state.

The power usage comparing unit 250 notifies the management node 100 of the abnormal state in the storage node 310 "S1".

According to the fourth exemplary embodiment of the present invention, it is possible to detect not only an abnormal state of allocated tasks in each of the processing nodes 300, but also an abnormal state of each of at least one other node used by the allocated tasks.

This is because the power usage collecting unit 230 generates/updates sets of piece of statistical data, each associated with a corresponding one of at least one other node used by allocated tasks, and the power usage comparing unit 250 compares a newly collected power of each of the at least one other node used by the allocated tasks with a value of a piece of statistical data (an average value) included in a corresponding one of the sets of piece of statistical data (average values).

An advantageous effect of the present invention is that it is possible to correctly detect an abnormal state of allocated tasks in each of processing nodes without using any resource of the processing node.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

For example, the correction of the determination range in accordance with the number of tasks, having been described in the third exemplary embodiment of the present invention, may be combined with the detection of an abnormal state of the other node, having been described in the fourth exemplary embodiment of the present invention.

What is claimed is:

1. An information processing system comprising:
   a power usage statistics storing unit that stores a statistical value representing a power usage of a processing node in a state of executing a task; and
   a power usage comparing unit that compares a newly collected power usage of the processing node in a state of executing the task with the statistical value representing a power usage of the processing node, which is stored in the power usage statistics storing unit, to detect an abnormal state of the task in the processing node, wherein
   the power usage statistics storing unit stores a series of statistical values each representing a power usage at each of predetermined intervals starting at a beginning of execution of the task in the processing node, and
   the power usage comparing unit compares a newly collected power usage at each of the predetermined intervals starting at a beginning of execution of the task in the processing node with a corresponding one of the series of statistical values each representing a power usage of the processing node, which are stored in the power usage statistics storing unit.

2. The information processing system according to claim 1, wherein, in the case where a difference between the newly collected power usage of the processing node and the statistical value representing a power usage of the processing node, which is stored in the power usage statistics storing unit, does not fall within a predetermined range, the power usage comparing unit determines that the task is in an abnormal state in the processing node.

3. The information processing system according to claim 1, wherein,
in the case where, when one or more tasks are being executed in the processing node, a difference between the newly collected power usage of the processing node and the statistical value representing a power usage of the processing node, which is stored in the power usage statistics storing unit, does not fall within a range resulting from correcting the predetermined range in accordance with a total number of the one or more tasks being executed in the processing node, the power usage comparing unit determines that the one or more tasks are in an abnormal state in the processing node.

4. The information processing system according to claim 1, wherein
the power usage statistics storing unit further stores a statistical value representing a power usage of an other node in a state of being used by the task being executed in the processing node, and
the power usage comparing unit further compares a newly collected power usage of the other node in a state of being used by the task being executed in the processing node with the statistical value representing a power usage of the other node in a state of being used by the task, which is stored in the power usage statistics storing unit, to detect an abnormal state of the other node.

5. The information processing system according to claim 1, further comprising:
a task distribution managing unit that divides a source task into a plurality of tasks and instructs a plurality of processing nodes to respectively execute the plurality of tasks; and
a power usage collecting unit that collects a power usage of each of the plurality of processing nodes,
wherein the power usage statistics storing unit stores a statistical value representing a power usage of each of the plurality of processing nodes, and the power usage comparing unit compares the power usage which is associated with each of the plurality of processing nodes and which is collected by the power usage collecting unit with the statistical value which representing a power usage of a corresponding one of the plurality of processing nodes, which is stored in the power usage statistics storing unit.

6. An information processing method comprising:
storing a statistical value representing a power usage of a processing node in a state of executing a task; and
detecting an abnormal state of the task in the processing node by comparing a newly collected power usage of the processing node in a state of executing the task with the statistical value representing a power usage of the processing node, wherein
in the storing, a series of statistical values each representing a power usage at each of predetermined intervals starting at a beginning of execution of the task in the processing node is stored, and
in the detecting, a newly collected power usage at each of the predetermined intervals starting at a beginning of execution of the task in the processing node is compared with a corresponding one of the stored series of statistical values each representing a power usage of the processing node.

7. The information processing method according to claim 6, wherein,
the detecting an abnormal state of the task determines that the task is in an abnormal state in the processing node in the case where a difference between the newly collected power usage of the processing node and the statistical value representing a power usage of the processing node, which is stored in the power usage statistics storing unit, does not fall within a predetermined range.

8. A non-transitory computer readable storage medium recording thereon a program, causing a computer to perform a method comprising:
storing a statistical value representing a power usage of a processing node in a state of executing a task; and
detecting an abnormal state of the task in the processing node by comparing a newly collected power usage of the processing node in a state of executing the task with the statistical value representing a power usage of the processing node, wherein
in the storing, a series of statistical values each representing a power usage at each of predetermined intervals starting at a beginning of execution of the task in the processing node is stored, and
in the detecting, a newly collected power usage at each of the predetermined intervals starting at a beginning of execution of the task in the processing node is compared with a corresponding on of the stored series of statistical values each representing a power usage of the processing node.

9. The non-transitory computer readable storage medium recording thereon the program according to claim 8, causing the computer to perform the method, wherein
the detecting an abnormal state of the task determines that the task is in an abnormal state in the processing node in the case where a difference between the newly collected power usage of the processing node and the statistical value representing a power usage of the processing node, which is stored in the power usage statistics storing unit, does not fall within a predetermined range.

10. An information processing system comprising:
a power usage statistics storing means for storing a statistical value representing a power usage of a processing node in a state of executing a task; and
a power usage comparing means for comparing a newly collected power usage of the processing node in a state of executing the task with the statistical value representing a power usage of the processing node, which is stored in the power usage statistics storing means, to detect an abnormal state of the task in the processing node, wherein
the power usage statistics storing means stores a series of statistical values each representing a power usage at each of predetermined intervals starting at a beginning of execution of the task in the processing node, and
the power usage comparing means compares a newly collected power usage at each of the predetermined intervals starting at a beginning of execution of the task in the processing node with a corresponding one of the series of statistical values each representing a power usage of the processing node, which are stored in the power usage statistics storing means.

* * * * *